(12) United States Patent
Suzuki

(10) Patent No.: US 9,019,623 B2
(45) Date of Patent: Apr. 28, 2015

(54) IMAGING ZOOM LENS AND IMAGING APPARATUS INCLUDING THE SAME

(71) Applicant: FUJIFILM Corporation, Tokyo (JP)

(72) Inventor: Takashi Suzuki, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/295,368

(22) Filed: Jun. 4, 2014

(65) Prior Publication Data

US 2014/0285903 A1 Sep. 25, 2014

Related U.S. Application Data

(63) Continuation of application No. PCT/JP2012/007903, filed on Dec. 11, 2012.

(30) Foreign Application Priority Data

Dec. 16, 2011 (JP) ................... 2011/275177

(51) Int. Cl.
*G02B 15/14* (2006.01)
*G02B 9/08* (2006.01)
*G02B 9/64* (2006.01)
*G02B 15/16* (2006.01)

(52) U.S. Cl.
CPC .. *G02B 9/08* (2013.01); *G02B 9/64* (2013.01); *G02B 15/161* (2013.01)

(58) Field of Classification Search
CPC .............. G02B 9/00; G02B 9/04; G02B 9/06; G02B 9/34; G02B 9/08; G02B 9/60; G02B 9/62; G02B 9/64

USPC .................. 359/680, 690, 691, 692, 693, 695
See application file for complete search history.

(56) References Cited

U.S. PATENT DOCUMENTS

| | | | | |
|---|---|---|---|---|
| 2,289,779 A | * | 7/1942 | Herzberger | 359/777 |
| 2,574,995 A | * | 11/1951 | Aklin | 359/779 |
| 3,802,765 A | | 4/1974 | Vuijk | |
| 4,176,913 A | * | 12/1979 | Nakamura et al. | 359/746 |
| 2006/0285227 A1 | | 12/2006 | Kobayashi | |
| 2007/0201147 A1 | | 8/2007 | Yokoyama | |

FOREIGN PATENT DOCUMENTS

| | | |
|---|---|---|
| JP | 48-088931 | 11/1973 |
| JP | 62-200316 | 9/1987 |
| JP | 1-193709 | 8/1989 |

(Continued)

OTHER PUBLICATIONS

International Search Report PCT/JP2012/007903 dated Apr. 16, 2013.

(Continued)

*Primary Examiner* — Darryl J Collins
*Assistant Examiner* — Journey Sumlar
(74) *Attorney, Agent, or Firm* — Young & Thompson

(57) ABSTRACT

The imaging lens substantially consists of a front group having positive refractive power, an aperture stop, and a rear group having positive refractive power in this order from the object side. The front group includes two positive meniscus lenses with convex surfaces toward the object side, and one negative meniscus lens with a convex surface toward the object side; and the rear group includes an aspheric lens and a three-cemented lens in this order from the object side.

11 Claims, 8 Drawing Sheets

EXAMPLE 1

(56) References Cited

FOREIGN PATENT DOCUMENTS

| | | |
|---|---|---|
| JP | 2001-083421 | 3/2001 |
| JP | 2004-258511 | 9/2004 |
| JP | 2007-025653 | 2/2007 |
| JP | 2007-264600 | 10/2007 |
| JP | 2007-333790 | 12/2007 |
| JP | 2008-032921 | 2/2008 |
| JP | 2010-014895 | 1/2010 |
| JP | 2013-019993 | 1/2013 |
| JP | 2013-109025 | 6/2013 |

OTHER PUBLICATIONS

International Preliminary Examination Report dated Oct. 1, 2013 in corresponding International Application No. PCT/JP2012/007903 with English language translation of International Preliminary Examination Report.

* cited by examiner

FIG.1  EXAMPLE 1
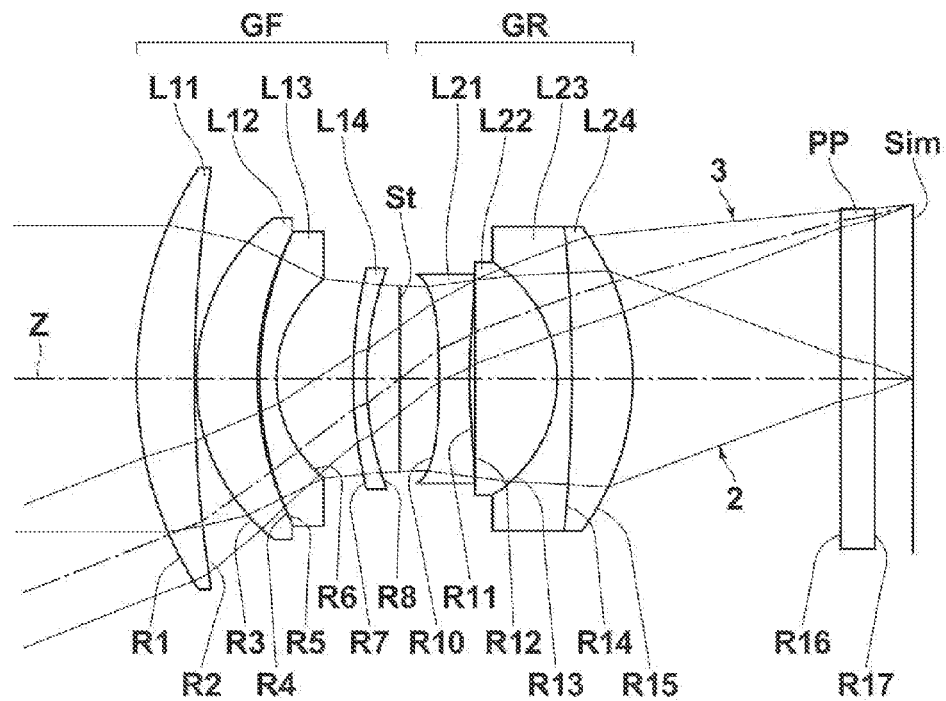
FIG.2  EXAMPLE 2
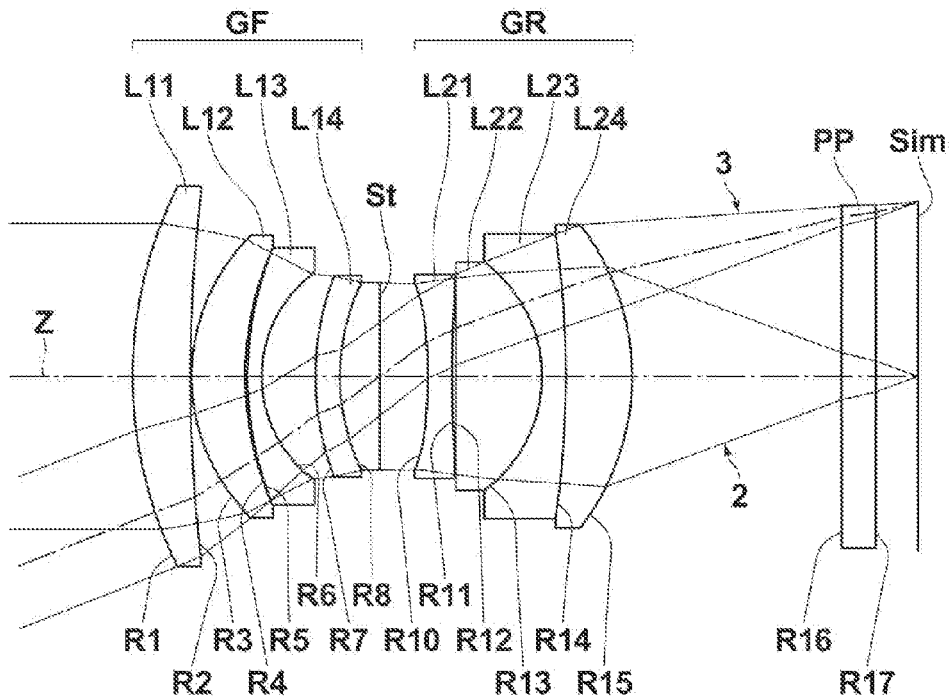

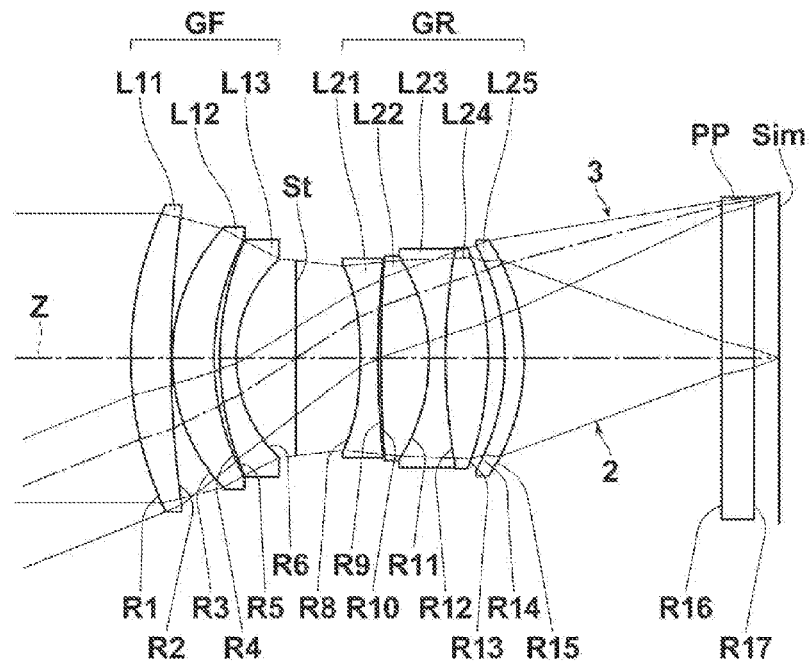
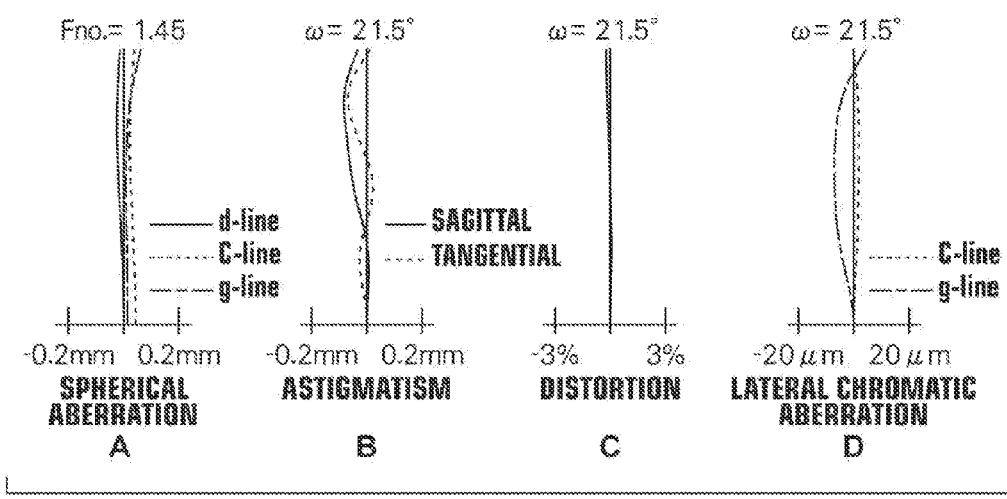

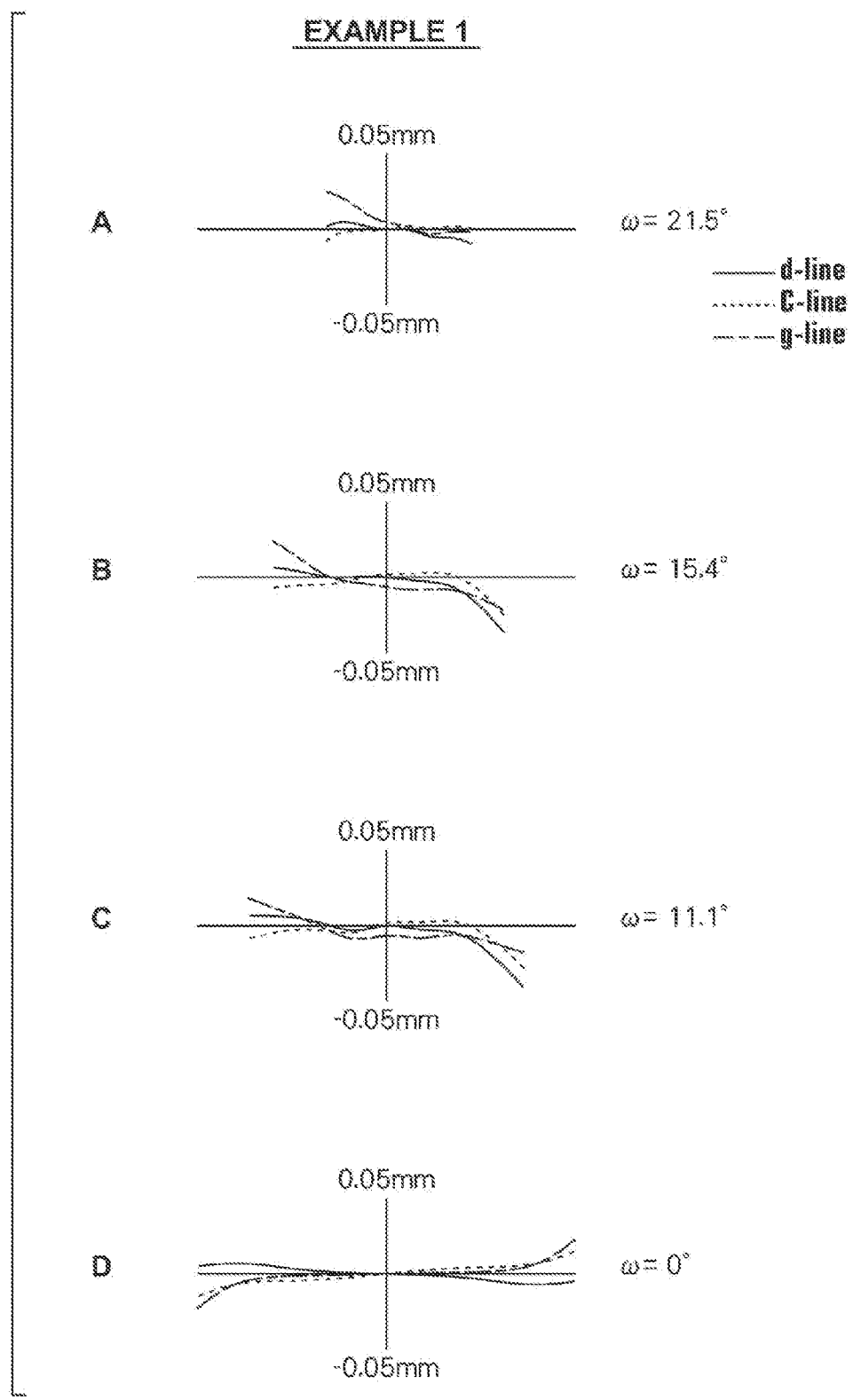

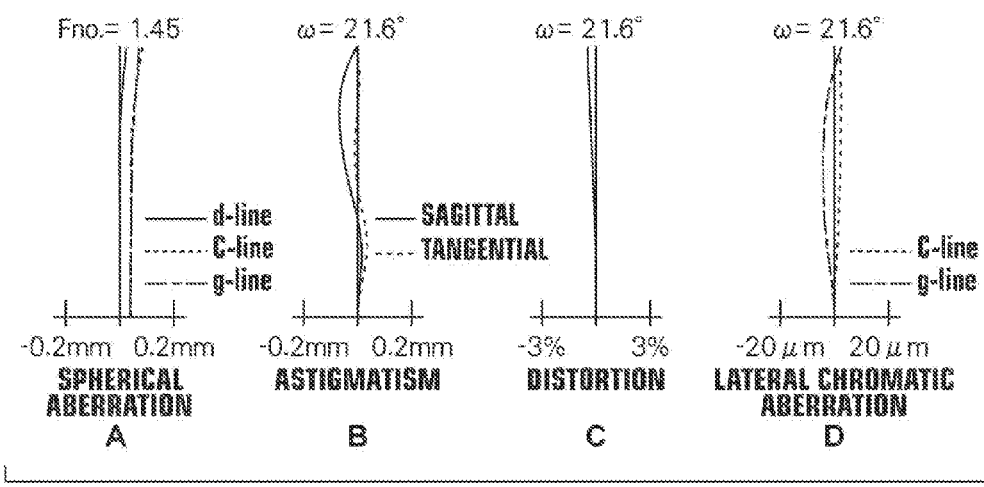

IMAGING ZOOM LENS AND IMAGING APPARATUS INCLUDING THE SAME

CROSS-REFERENCE TO RELATED APPLICATIONS

This application is a Continuation of PCT International Application No. PCT/JP2012/007903 filed on Dec. 11, 2012, which claims priority under 35 U.S.C §119 (a) to Japanese Patent Application No. 2011-275177 filed on Dec. 16, 2011. Each of the above application (s) is hereby expressly incorporated by reference, in its entirety, into the present application.

TECHNICAL FIELD

The present invention relates to an imaging lens and an imaging apparatus provided with the imaging lens, and for example to an imaging lens that can be suitably used as a standard lens of a film camera and a digital camera, as well as an imaging apparatus provided with the imaging lens.

DESCRIPTION OF THE RELATED ART

In general, the double Gauss type lens having a substantially symmetric lens configuration in which an aperture stop is located between lenses or modifications thereof are mainly used for standard lenses for cameras in order to obtain a lens system with a small F-number and little spherical aberration (for example, refer to Japanese Unexamined Patent Publication No. 2010-014895). In order to further reduce spherical aberration, aspheric lenses have been applied for these types of lenses (for example, refer to Japanese Unexamined Patent Publication No. 2007-333790 and Japanese Unexamined Patent Publication No. 2008-032921).

SUMMARY OF THE INVENTION

However, in the substantially symmetrical double Gauss type lens system, since spherical aberration of the entire system is the sum of spherical aberrations of a lens group on the object side of the aperture stop and a lens group on the image side thereof, there was limit to the amount of spherical aberration that could be corrected and it was difficult to reduce chromatic coma aberration in addition to spherical aberration even if aspheric surfaces were used. Moreover, in recent years, along with the acceleration of the price competition and miniaturization of cameras, there is strong demand for a lens system to be mounted on a camera to have high performance and achieve miniaturization and low cost.

The present invention has been developed in view of the above problems. It is an object of the present invention to provide an imaging lens which achieves favorable correction of various aberrations, such as spherical aberration and chromatic aberration, and which has high optical performance, while enabling miniaturization and a low cost; and to provide an imaging apparatus provided with the imaging lens.

The imaging lens of the present invention substantially consists of a front group having positive refractive power, an aperture stop, and a rear group having positive refractive power in this order from the object side, wherein the front group includes two positive meniscus lenses with convex surfaces toward the object side, and one negative meniscus lens with a convex surface toward the object side; and the rear group includes an aspheric lens and a three-cemented lens in this order from the object side.

It is preferable for the three-cemented lens of the rear group in the imaging lens of the present invention to be formed by cementing a positive lens with a convex surface toward the image side, a negative lens, and a positive lens with a convex surface toward the image side together in this order from the object side.

It is preferable for the front group of the imaging lens of the present invention to include a positive meniscus lens with a convex surface toward the object side, a positive meniscus lens with a convex surface toward the object side, and a negative meniscus lens with a convex surface toward the object side in this order from the object side.

It is preferable for the three-cemented lens of the rear group in the imaging lens of the present invention to include positive lenses and to satisfy conditional expression (1) below, and more preferably conditional expression (1'):

$$Nd2 > 1.8 \tag{1}$$

$$Nd2 > 1.85 \tag{1'},$$

where
Nd2: an average value of the refractive index with respect to the d-line of the positive lenses within the three-cemented lens. Note that in the case that the three-cemented lens includes a plurality of positive lenses, Nd2 is as described above; and in the case that the three-cemented lens includes only one positive lens, Nd2 is the refractive index with respect to the d-line of the positive lens.

It is preferable for the three-cemented lens of the imaging lens of the present invention to be formed by cementing a positive lens, a negative lens, and a positive lens together in this order from the object side, and to satisfy conditional expression (2) below, and more preferably conditional expression (2') below:

$$vd2p - vd2n > 10 \tag{2}$$

$$vd2p - vd2n > 12 \tag{2'},$$

where
vd2p: the Abbe number of the lens having a larger Abbe number with respect to the d-line of the two positive lenses among the three-cemented lens, and
vd2n: the Abbe number with respect to the d-line of a negative lens within the three-cemented lens.

It is preferable for the imaging lens of the present invention to satisfy conditional expression (3) below, and more preferably conditional expression (3') below:

$$Nd1 > 1.7 \tag{3}$$

$$Nd1 > 1.75 \tag{3'},$$

where
Nd1: an average value of the refractive index with respect to the d-line of the positive lenses within the front group.

It is preferable for the imaging lens of the present invention to satisfy conditional expression (4) below, and more preferably conditional expression (4') below:

$$2 < f/Y < 5 \tag{4}$$

$$2.1 < f/Y < 3.5 \tag{4'},$$

where
f: the focal length of the entire system, and
Y: a maximum image height on the image surface.
Note that a maximum image height can be determined according to the specification of the imaging lens, the specification of an imaging apparatus on which the imaging lens is mounted, and the like.

The front group of the imaging lens of the present invention may be configured to substantially consist of a positive meniscus lens with a convex surface toward the object side, a positive meniscus lens with a convex surface toward the object side, a negative meniscus lenses with a convex surface toward the object side, and a negative meniscus lenses with a convex surface toward the object side, in this order from the object side.

Note that the above expression "The imaging lens of the present invention substantially consists of" intends to include an imaging lens that includes lenses substantially without any refractive power; optical elements other than lenses such as aperture stops, glass covers, and filters; and mechanical components such as lens flanges, lens barrels, imaging elements, and camera shake correction mechanisms; in addition to the constituent elements listed above.

The surface shapes and the signs of the refractive powers of the above lens should be considered in paraxial regions if aspheric surfaces are included therein.

The imaging apparatus of the present invention is provided with the imaging lens of the present invention.

According to the present invention, the lens configurations of the front group and the rear group are appropriately set in the lens system consisting of the positive front group, an aperture stop, and the positive rear group in this order from the object side. Therefore, an imaging lens, which achieves favorable correction of various aberrations, such as spherical aberration and chromatic aberration, and which has high optical performance, while enabling miniaturization and low cost, and an imaging apparatus including the imaging lens can be provided.

BRIEF DESCRIPTION OF THE DRAWINGS

FIG. 1 is a cross-sectional view illustrating a lens configuration and optical paths of an imaging lens of Example 1 of the present invention.

FIG. 2 is a cross-sectional view illustrating a lens configuration and optical paths of an imaging lens of Example 2 of the present invention.

FIG. 3 is a cross-sectional view illustrating a lens configuration and optical paths of an imaging lens of Example 3 of the present invention.

A through D of FIG. 4 respectively illustrate aberration diagrams of the imaging lens of Example 1 of the present invention.

A through D of FIG. 5 respectively illustrate lateral aberration diagrams of the imaging lens of Example 1 of the present invention.

A through D of FIG. 6 respectively illustrate aberration diagrams of the imaging lens of Example 2 of the present invention.

Figure 7:
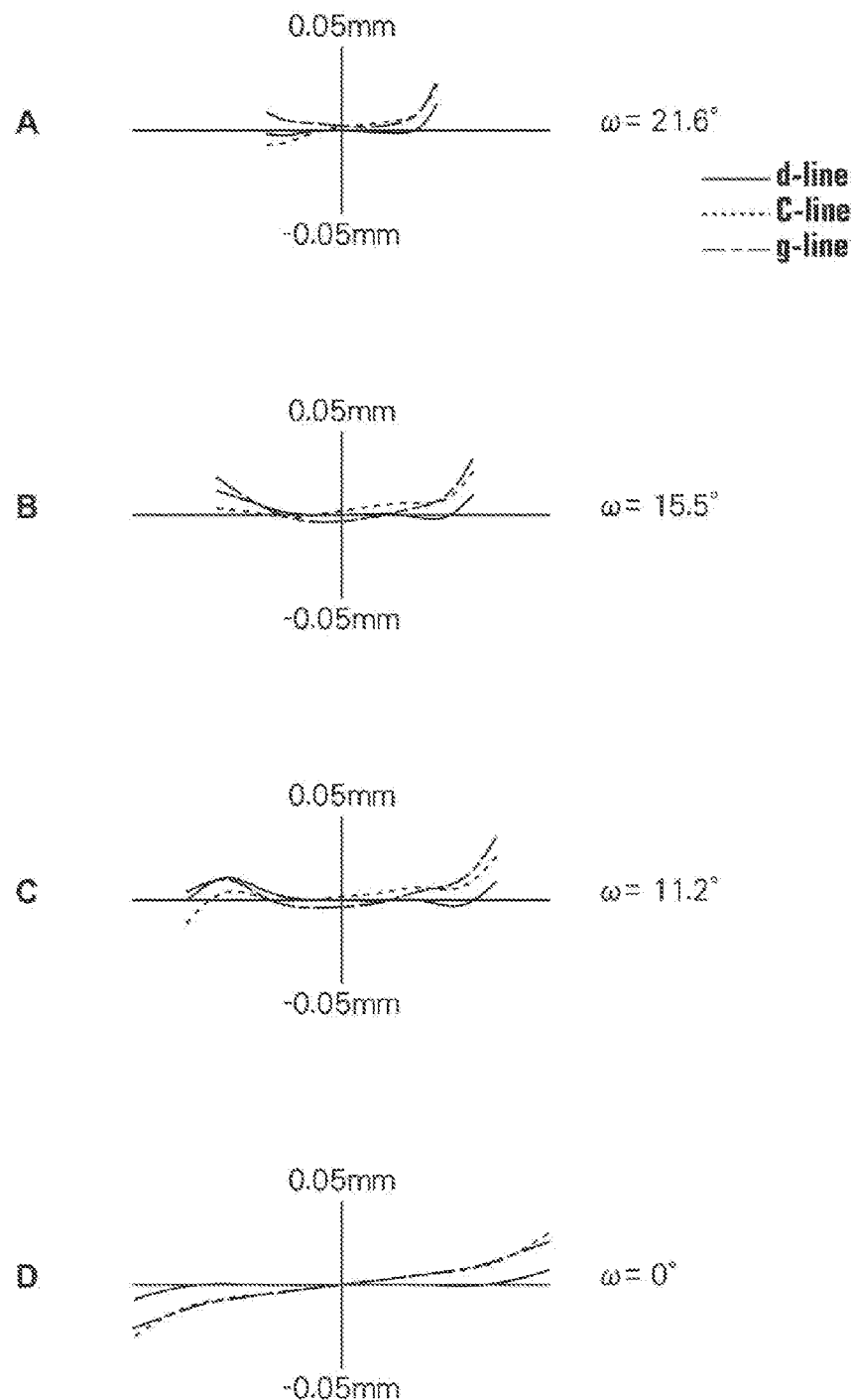

A through D of FIG. 7 respectively illustrate lateral aberration diagrams of the imaging lens of Example 2 of the present invention.

Figure 8:
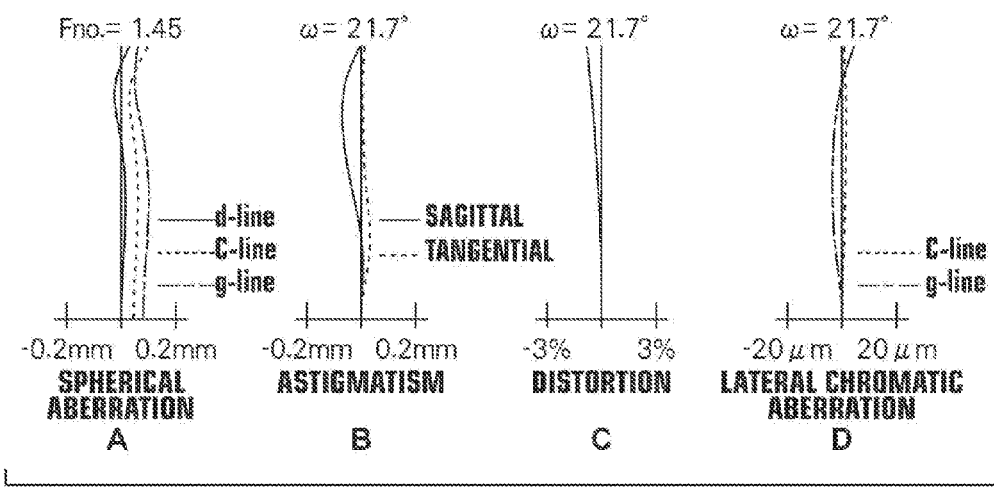

A through D of FIG. 8 respectively illustrate aberration diagrams of the imaging lens of Example 3 of the present invention.

Figure 9:
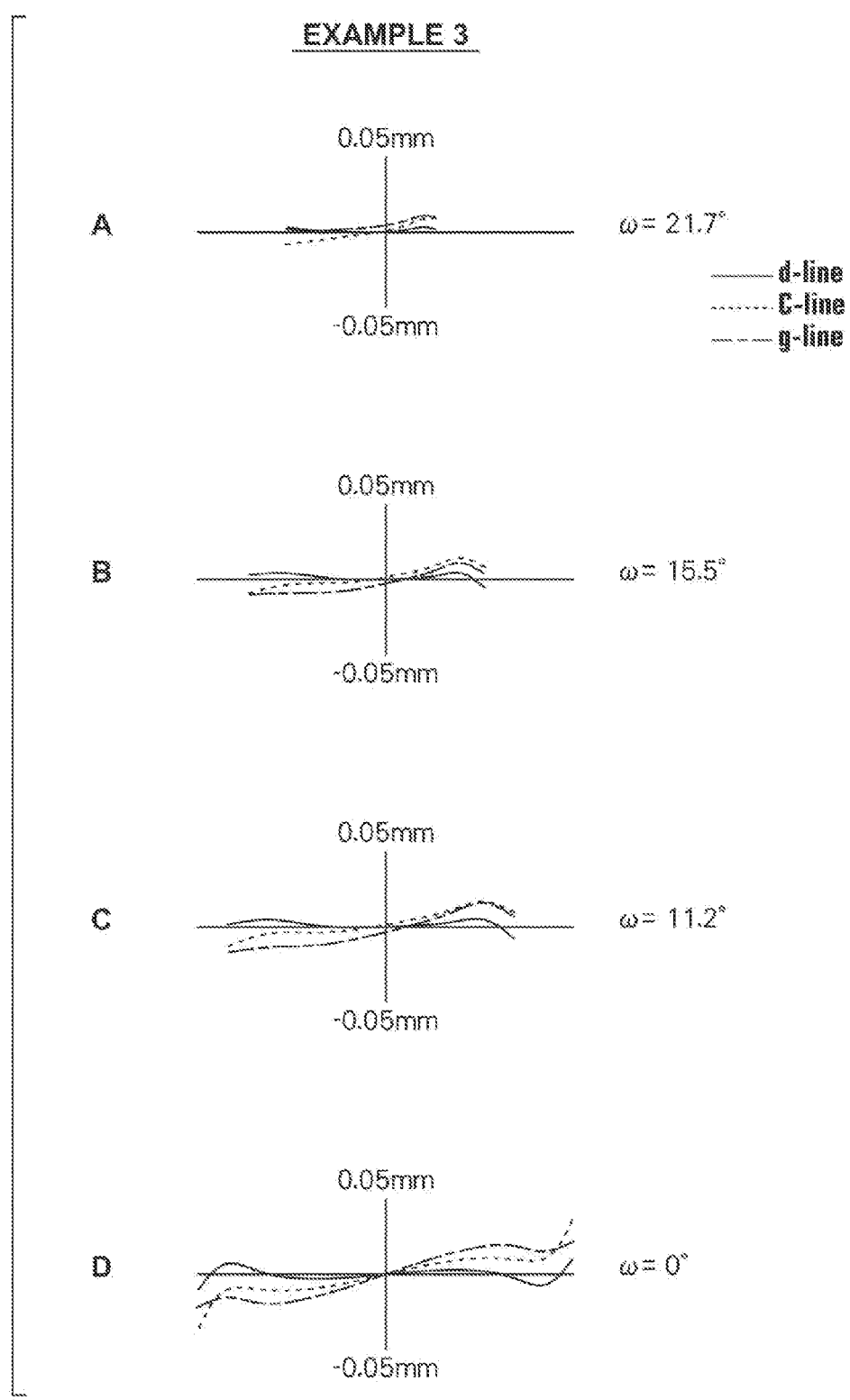

A through D of FIG. 9 respectively illustrate lateral aberration diagrams of the imaging lens of Example 3 of the present invention.

Figure 10:
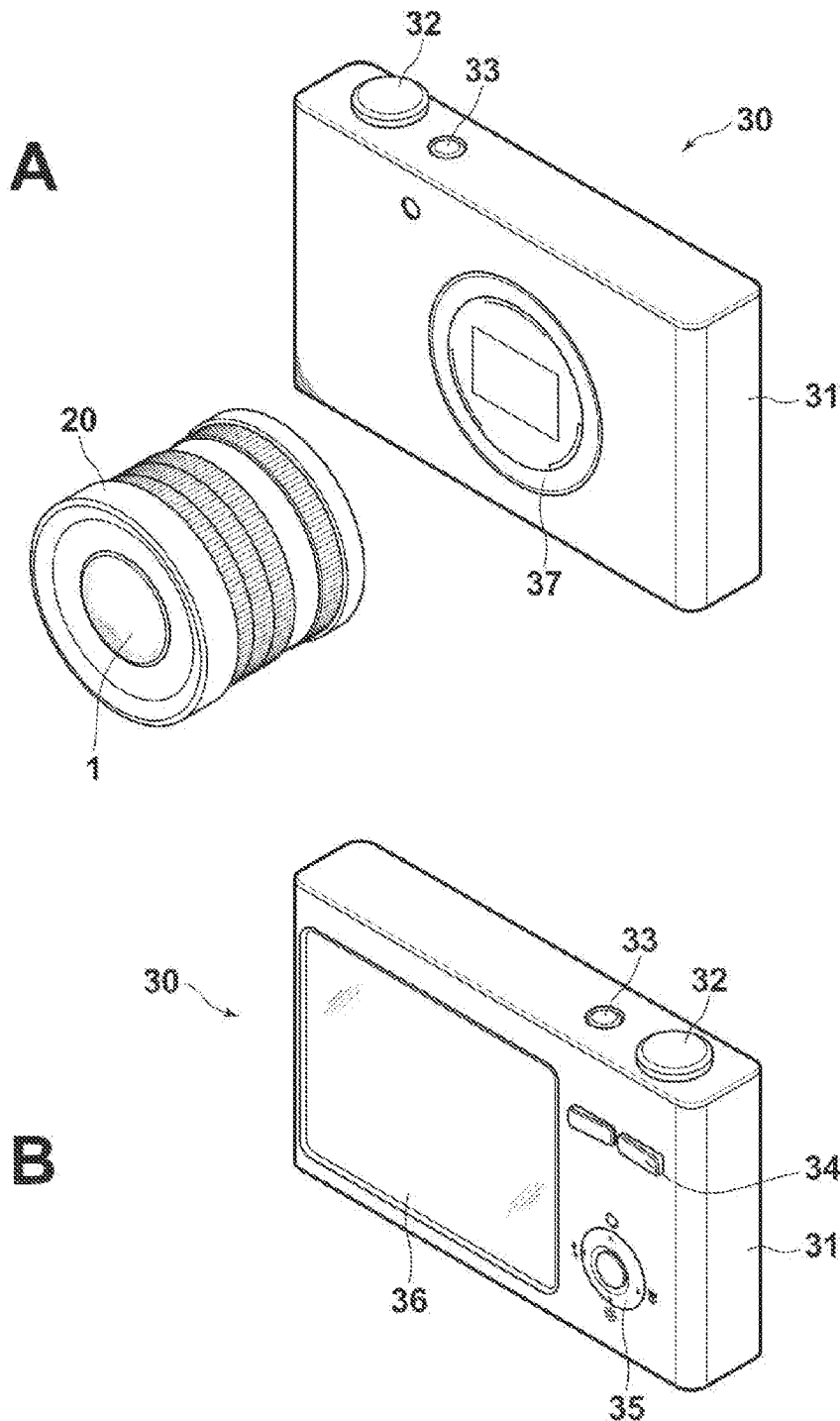

A and B of FIG. 10 are perspective views of the imaging apparatus according to the embodiments of the present invention, illustrating configurations thereof.

DESCRIPTION OF THE PREFERRED EMBODIMENTS

Hereinafter, embodiments of the present invention will be described in detail with reference to the accompanying drawings. Each of FIGS. 1 through 3 is a cross-sectional view of the imaging lens according to the embodiments of the present invention, illustrating a configuration thereof. FIGS. 1 through 3 corresponds to Example 1 through 3 to be described later, respectively. In FIGS. 1 through 3, the left side is designated as the object side, and the right side is designated is as the image side. An axial light beam 2 from an object at an infinite distance and a light beam 3 of a maximum image height are shown therein as well. Item Ri (i is an integer) indicated in FIGS. 1 through 3 represents the radius of curvature and will be described in the detailed description of the Examples to be described later. Note that since the basic configurations illustrated in FIGS. 1 through 3 and the manners in which the configurations are illustrated therein are all the same, a description will be given mainly with reference to the configuration shown in FIG. 1 as a representative example.

The imaging lens of the present invention substantially consists of a front group GF having positive refractive power as a whole; an aperture stop St; and a rear group GR having positive refractive power as a whole along the optical axis Z in this order from the object side. Note that the aperture stop St shown in each of FIGS. 1 through 3 does not necessarily represent the size nor shape thereof, but the position thereof on the optical axis Z.

The front group GF of the imaging lens of the example shown in FIG. 1 substantially consists of four lenses, i.e., a lens L11 having a positive meniscus shape with a convex surface toward the object side, a lens L12 having a positive meniscus shape with a convex surface toward the object side, a lens L13 having a negative meniscus shape with a convex surface toward the object side, and a lens L14 having a negative meniscus shape with a convex surface toward the object side in this order from the object side. The rear group GR substantially consists of four lenses, i.e., a lens L21 having a biconcave shape in a paraxial region, a lens L22 having a plano-convex shape with a convex surface toward the image side, a lens 23 having a negative meniscus shape with a convex surface toward the image side, and a lens L24 having a positive meniscus shape with a convex surface toward the image side in this order from the object side. The lens L21 is an aspheric lens. The three lenses, the lenses L22, L23, and L24 are cemented to each other; and the other lenses are single lenses which are not cemented to each other.

Note that when applying the imaging lens to an imaging apparatus, the imaging apparatus can be configured to appropriately include a cover glass for protecting the imaging elements, and various types of filters, such as a low-pass filter, an infrared cut filter, and the like, according to the specification of the imaging apparatus. FIG. 1 illustrates an example in which a parallel plate optical member PP is disposed between the most image side lens surface and the image surface Sim, supposing the above.

The imaging lens of the present embodiments can be regarded as a lens system based on the double Gauss type, in which further improvements are made mainly to the rear group. As the front group GF on the object side of the aperture stop St and the rear group GR of the image thereof are both designated as positive lens groups, off-axis aberration can be effectively corrected. The front group GF includes two positive meniscus lenses with convex surfaces toward the object side and a negative meniscus lens with a convex surface toward the object side. The rear group includes an aspheric lens and a three-cemented lens formed by cementing three lenses, in this order from the object side.

As the lenses constituting each lens group are configured as described above in the configuration substantially consisting of a positive front group GF, an aperture stop St, and a rear group GR, in this order from the object side, it will be advantageous in that a lens system, in which spherical aberration and chromatic coma aberration are favorably corrected, having a small F-number can be realized while achieving miniaturization.

As the front group GF includes two positive meniscus lenses with convex surfaces toward the object side and a negative meniscus lens with a convex surface toward the object side, it will be advantageous in that spherical aberration can be satisfactorily corrected in an optical system with a small F-number.

Regarding the order in which the three meniscus lenses described above are arranged in the front group GF, it is desirable for a positive meniscus lens with a convex surface toward the object side, a positive meniscus lens with a convex surface toward the object side, and a negative meniscus lens with a convex surface toward the objects side to be arranged in this order from the object side. Such an arrangement is advantageous from the viewpoint of satisfactorily correcting spherical aberration in an optical system with a small F-number.

Moreover, the rear group GR including the three-cemented lens is advantageous from the viewpoint of correction of chromatic aberration, for example, elimination of a secondary spectrum. Further, as the rear group GR includes an aspheric lens on the object side of the three-cemented lens, light beams, in which spherical aberration has been effectively corrected by the aspheric lens, can enter the three-cemented lens, thereby enabling satisfactory correction of spherical aberration, chromatic coma aberration, and lateral chromatic aberration.

It is desirable for the aspheric lens of the rear group GR to be a single lens, both surfaces of which are air contact surfaces, having a biconcave shape in the paraxial region in order to favorably correct aberrations.

As the aspheric lens is arranged on the object side of the three-cemented lens, the diameter of the aspheric lens can be smaller than a case in which the aspheric lens is arranged on the image side of the three-cemented lens, thereby contributing to miniaturization and reduction of cost. It is desirable for the aspheric lens to be arranged immediately behind the aperture stop St. This case is more advantageous from the viewpoint of reduction of the diameter of the aspheric lens.

Note that in many conventional double-gauss type lens systems, the lens surface disposed immediately behind the aperture stop on the image side has a radius of curvature with a low absolute value. Such lens systems caused the amount of aberration to be increased and flare to easily occur. In contrast, in the imaging lens of the present embodiment, the lens surface disposed immediately behind the aperture stop St is aspheric, and thereby the absolute value of the radius of curvature of this surface can be relatively large and the amount of generated aberrations and flare can be suppressed. This can contribute to establishment of high optical performance.

It is desirable for the three-cemented lens of the rear group GR to be formed by cementing a positive lens with a convex surface toward the image side, a negative lens, and a positive lens with a convex surface toward the image side in this order from the object side. The three-cemented lens formed by cementing lenses with a negative lens between positive lenses, instead of cementing a positive lens between negative lenses is advantageous from the viewpoint of configuring a positive rear group GR with a minimal number of lenses.

Two positive lenses within the three-cemented lens of the rear group GR are configured as described above in the lens system in which the front group GF has meniscus lenses with convex surfaces toward the object side. This is advantageous from the viewpoint of favorable correction of field curvature.

In the case that a negative lens is configured to have a convex surface toward the image side, in addition to two positive lenses, in the three-cemented lens of the rear group as shown in the example of FIG. 1, it is advantageous from the viewpoint of favorably correcting field curvature. Note that the negative lens of the three-cemented lens may be configured to have a concave surface toward the image side as shown in the example of FIG. 3. In this case, this is advantageous from the viewpoint of correction of lateral chromatic aberration.

The surface on the most object side of the three-cemented lens may be a planar surface as in the example shown in FIG. 1. In this case, a lens system having superior manufacturability that achieves low cost can be provided.

In the example of FIG. 1, the front group GF substantially consists of four lenses and the rear group GR substantially consists of four lenses. The front group GF of the example illustrated in FIG. 1 is of a four lens configuration substantially consisting of a positive meniscus lens with a convex surface toward the object side, a positive meniscus lens with a convex surface toward the object side, a negative meniscus lens with a convex surface toward the object side, and a negative meniscus lens with a convex surface toward the object side in this order from the object side. Such a configuration is advantageous from the viewpoint of favorably correcting spherical aberration in an optical system with a small F-value. A lens system having good symmetric properties can be provided, by both the front group GF and the rear group GR having a four lens configuration.

The example of FIG. 2 adopts the same lens configuration as the example of FIG. 1. In the example of FIG. 3, the front group GF substantially consists of three lenses and the rear group GR substantially consists of five lenses: an aspheric lens, a three-cemented lens, and a positive meniscus lens with a convex surface toward the image side in this order from the object side.

Each of examples of FIGS. 1 through 3 shows a configuration in which eight lenses, which is a comparatively small number of lenses, are arranged in the entire system. According to the imaging lenses of the present embodiments, lens systems that achieve favorable correction of various aberrations, such as spherical aberration and chromatic coma aberration, and which have high optical performance, can be realized, while suppressing the number of lenses and enabling a low cost and miniaturization.

It is preferable for the imaging lens of the present embodiment to satisfy conditional expression (1) below:

$$Nd2 > 1.8 \tag{1},$$

where
Nd2: an average value of the refractive index with respect to the d-line of positive lenses in the three-cemented lens.

If conditional expression (1) is satisfied, spherical aberration and field curvature can be corrected satisfactorily. If the value of Nd2 is lower than the lower limit defined by conditional expression (1), the amount of spherical aberration will be increased and the burden of correction of spherical aberration imposed on the aspheric lens will also be increased, thereby making it difficult to favorably correct field curvature.

In the case that the three-cemented lens of the rear group GR is formed by cementing a positive lens, a negative lens, and a positive lens together in this order from the object side, it is preferable for conditional expression (2) below to be satisfied:

$$\nu d2p - \nu d2n > 10 \tag{2},$$

where
vd2p: the Abbe number of a lens having a larger Abbe number with respect to the d-line between two positive lenses of the three-cemented lens, and
vd2n: the Abbe number with respect to the d-line of a negative lens within the three-cemented lens.

If conditional expression (2) is satisfied, longitudinal chromatic aberration and lateral chromatic aberration can be corrected satisfactorily. If the lower limit defined by conditional expression (2) is not satisfied, in the case that longitudinal chromatic aberration is attempted to be favorably corrected, the amount of chromatic coma aberration will be increased.

It is preferable for positive lenses of the front group GF to satisfy conditional expression (3) below:

$$Nd1>1.7 \quad (3),$$

where
Nd1: an average value of the refractive index with respect to the d-line of positive lenses within the front group.

If conditional expression (3) is satisfied, favorable correction of spherical aberration and field curvature will become possible. If the value of Nd1 is lower than the lower limit defined by conditional expression (3), the amount of spherical aberration will be increased and the burden of correction of spherical aberration imposed on the aspheric lens will be increased, thereby making it difficult to favorably correct field curvature.

It is preferable for a maximum image height on the image surface Sim to satisfy conditional expression (4) below:

$$2<f/Y<5 \quad (4),$$

where
f: the focal length of the entire system, and
Y: a maximum image height on the image surface.

If conditional expression (4) is satisfied, favorable correction of field curvature and miniaturization of the lens system will be possible. If the value of f/Y is lower than the lower limit defined by conditional expression (4), favorable correction of field curvature will become difficult. If the value of f/Y exceeds the upper limit defined by conditional expression (4), miniaturization of the lens system will become difficult.

In order to further enhance the advantageous effects obtained in the case that conditional expressions (1) through (4) described above are respectively satisfied, it is more preferable for conditional expressions (1') through (4') below to be satisfied, instead of conditional expressions (1) through (4):

$$Nd2>1.85 \quad (1')$$

$$vd2p-vd2n>12 \quad (2')$$

$$Nd1>1.75 \quad (3'),$$

and $$2.1<f/Y<3.5 \quad (4').$$

The imaging lens of the present invention can selectively adopt one or an arbitrary combination of the preferred configurations described above as appropriate. Further, although not shown in FIGS. 1 through 3, the imaging lens of the present invention may be provided with a light shielding means which suppresses the occurrence of flare, various kinds of filters and the like between the lens system and the image surface Sim.

Next, Numerical Examples of the imaging lens of the present invention will be described.

EXAMPLE 1

A cross-sectional view of the imaging lens of Example 1 is shown in FIG. 1. Since the manner it is shown is as described above, redundant descriptions thereof will be omitted.

The schematic configuration of the imaging lens of the Example 1 is as described below. That is, the imaging lens substantially consists of a front group GF having positive refractive power; an aperture stop St; and a rear group GR having positive refractive power in this order from the object side. The front group GF of the imaging lens of an example shown in FIG. 1 substantially consists of four lenses, i.e., a lens L11 having a positive meniscus shape with a convex surface toward the object side, a lens L12 having a positive meniscus shape with a convex surface toward the object side, a lens L13 having a negative meniscus shape with a convex surface toward the object side, and a lens L14 having a negative meniscus shape with a convex surface toward the object side in this order from the object side. The rear group GR substantially consists of four lenses, i.e., a lens L21 having a biconcave shape in a paraxial region, a lens L22 having a plano-convex shape with a convex surface toward the image side, a lens 23 having a negative meniscus shape with a convex surface toward the image side, and a lens L24 having a positive meniscus shape with a convex surface toward the image side in this order from the object side. The lens L21 has aspheric surfaces on both sides thereof. The three lenses L22, L23, and L24 are cemented to each other so as to constitute a three-cemented lens; and the other lenses are not cemented to each other, but are single lenses.

Table 1 shows basic lens data of the imaging lens of Example 1. In Table 1, the column Si shows the i-th (i=1, 2, 3, . . . ) surface number, the value of i sequentially increasing from the surface of the constituent element at the most object side, which is designated as 1, toward the image side. The column Ri shows the radius of curvature of the i-th surface, and the column Di shows the distances between i-th surfaces and (i+1)st surfaces along the optical axis Z. Note that the signs of the radius of curvature are positive in the case that a surface shape is convex on the object side, and negative in the case that the surface shape is convex on the image side.

In Table 1, the column Ndj shows the refractive index of a j-th (j=1, 2, 3, . . . ) optical element with respect to the d-line (wavelength: 587.56 nm), the value of j sequentially increasing from the optical element at the most object side, which is designated as 1, toward the image side. The column vdj shows the Abbe number of the j-th optical element with respect to the d-line. Note that the lens data represents the aperture stop St and the optical member PP as well. The column of the surface number of a surface corresponding to the aperture stop St indicates a surface number and the letters (St).

In Table 1, an asterisk mark * is attached to the surface number of aspheric surfaces and the values of paraxial radii of curvature are shown as the radii of curvature of the aspheric surfaces. Table 2 shows aspheric surface coefficients of these aspheric surfaces. In Table 2, the surface numbers of aspheric surfaces are represented in the column Si. "E-n" (n: integer) shown in the numerical values of the aspheric surface coefficients represents "×10$^{-n}$". The aspheric surface coefficient represents a value of each of coefficients K and Am (m=3, 4, 5, . . . 20) in the aspheric surface expression below:

$$Zd=C \cdot h^2/\{1+(1-K \cdot C^2 \cdot h^2)^{1/2}\}+)\Sigma Am \cdot h^m$$

where,

Zd: the depth of an aspheric surface (the length of a perpendicular line drawn from a point on an aspheric surface with a height h to a plane perpendicular to the optical axis which contacts the peak of the aspheric surface)

h: height (the distance from the optical axis to a lens surface)

C: a paraxial curvature

K, Am: aspheric surface coefficients (m=3, 4, 5, . . . 20).

Table 7 shown below shows specs, a maximum image height, and values corresponding to conditional expressions (1) through (4) of the imaging lens of each of Examples 1, 2, and 3.

In each of Tables below, degrees are used as the unit of angles and mm is used as the unit of length, but other appropriate units may also be used, as optical systems are usable even when they are proportionally enlarged or miniaturized. Numerical values rounded to a predetermined number of digits are shown in the following tables.

TABLE 1

Example 1 Basic Lens Data

| Si | Ri | Di | Ndj | νdj |
|---|---|---|---|---|
| 1 | 31.767 | 4.70 | 1.75500 | 52.3 |
| 2 | 108.050 | 0.15 | | |
| 3 | 16.733 | 5.01 | 1.80400 | 46.6 |
| 4 | 25.973 | 0.20 | | |
| 5 | 27.720 | 1.35 | 1.69895 | 30.1 |
| 6 | 10.424 | 6.27 | | |
| 7 | 37.345 | 1.10 | 1.60342 | 38.0 |
| 8 | 25.375 | 2.73 | | |
| 9 (St) | ∞ | 3.20 | | |
| *10 | −94.514 | 2.50 | 1.51760 | 63.5 |
| *11 | 45.548 | 0.45 | | |
| 12 | ∞ | 6.72 | 1.88300 | 40.8 |
| 13 | −11.174 | 1.20 | 1.76182 | 26.5 |
| 14 | −124.500 | 4.99 | 1.88300 | 40.8 |
| 15 | −20.516 | 17.00 | | |
| 16 | ∞ | 2.80 | 1.51680 | 64.2 |
| 17 | ∞ | | | |

TABLE 2

Example 1 Aspheric Surface Coefficient

| Si | 10 | 11 |
|---|---|---|
| K | 0.0000000E+00 | 0.0000000E+00 |
| A3 | 1.4267934E−03 | 1.4075342E−03 |
| A4 | −1.6625706E−03 | −1.5407051E−03 |
| A5 | 7.1056683E−04 | 7.2833847E−04 |
| A6 | −9.1063817E−05 | −1.3764849E−04 |
| A7 | −6.7671475E−05 | −3.4723387E−05 |
| A8 | 3.1530346E−05 | 2.1553742E−05 |
| A9 | −2.7404199E−06 | −2.4723865E−06 |
| A10 | −1.2148981E−06 | −6.0987942E−07 |
| A11 | 2.9053673E−07 | 1.7824931E−07 |
| A12 | 6.3508375E−09 | −3.5081942E−09 |
| A13 | −7.9573382E−09 | −3.6689473E−09 |
| A14 | 4.5951622E−10 | 3.8060840E−10 |
| A15 | 9.3989975E−11 | 2.1235855E−11 |
| A16 | −9.7762088E−12 | −5.4237286E−12 |
| A17 | −4.3352953E−13 | 1.6515932E−13 |
| A18 | 7.1170331E−14 | 2.1078707E−14 |
| A19 | 2.5581917E−16 | −1.6918406E−15 |
| A20 | −1.6083703E−16 | 3.4763829E−17 |

Aberration diagrams of spherical aberration, astigmatism, distortion, and lateral chromatic aberration of the imaging lens of Example 1 are illustrated respectively in A to D of FIG. 4. Lateral aberration diagrams of the imaging lens of Example 1 are illustrated respectively A to D of FIG. 5. Fno. in the spherical aberration diagrams represents the F-number and ω in the other aberration diagrams represents the half angle of view. Each aberration diagram is with respect to the d-line (587.56 nm), but the spherical aberration diagrams and lateral aberration diagrams also illustrate aberrations with respect to the g-line (wavelength of 435.84 nm) and C-line (wavelength of 656.27 nm), and the lateral chromatic aberration diagrams illustrate aberrations with respect to the g-line and the C-line. In the astigmatism diagrams, the solid line illustrates astigmatism in the sagittal direction while the dotted line illustrates astigmatism in the tangential direction. The lateral aberration diagrams are with respect to the tangential direction.

As the manners in which the drawings are shown, the items in the Tables, the meanings thereof, and the manners in which they are shown with respect to the imaging lens of Example described above, apply to Examples 2 and 3 below, redundant descriptions thereof will be omitted unless otherwise noted.

EXAMPLE 2

FIG. 2 shows a lens cross-sectional view of the imaging lens of Example 2. The schematic configuration of the imaging lens of Example 2 is the same as Example 1. Tables 3 and 4 show the basic lens data and aspheric surface coefficients with respect to Example 2, respectively. A through D of FIG. 6 and A through D of FIG. 7 show aberration diagrams of the imaging lens of Example 2, respectively.

TABLE 3

Example 2 Basic Lens Data

| Si | Ri | Di | Ndj | νdj |
|---|---|---|---|---|
| 1 | 34.578 | 4.67 | 1.75500 | 52.3 |
| 2 | 124.510 | 0.10 | | |
| 3 | 16.072 | 4.36 | 1.88300 | 40.8 |
| 4 | 25.714 | 0.20 | | |
| 5 | 27.823 | 1.14 | 1.69895 | 30.1 |
| 6 | 10.447 | 4.37 | | |
| 7 | 22.730 | 1.99 | 1.84666 | 23.8 |
| 8 | 17.619 | 3.24 | | |
| 9(St) | ∞ | 3.88 | | |
| *10 | −59.791 | 1.99 | 1.51760 | 63.5 |
| *11 | 69.708 | 0.30 | | |
| 12 | ∞ | 7.02 | 1.88300 | 40.8 |
| 13 | −11.513 | 1.93 | 1.78472 | 25.7 |
| 14 | −80.968 | 5.42 | 1.88300 | 40.8 |
| 15 | −20.054 | 17.00 | | |
| 16 | ∞ | 2.80 | 4.51680 | 64.2 |
| 17 | ∞ | | | |

TABLE 4

Example 2 Aspheric Surface Coefficient

| Si | 10 | 11 |
|---|---|---|
| K | 0.0000000E+00 | 0.0000000E+00 |
| A3 | −1.7729788E−04 | −1.0038361E−05 |
| A4 | −5.2534947E−05 | −9.5081311E−05 |
| A5 | −1.1761120E−05 | 1.9211477E−05 |
| A6 | −3.0767121E−06 | −4.1689918E−06 |
| A7 | 4.7761686E−07 | 2.7286509E−07 |
| A8 | 3 5220421E−08 | 1.3673138E−08 |
| A9 | −3.7757415E−09 | −2.6472505E−10 |
| A10 | −5.6584432E−10 | −7.9802170E−11 |
| A11 | −1.5255821E−11 | −6.5981308E−12 |
| A12 | 3.2334584E−12 | −4.2222810E−13 |
| A13 | 4.9279596E−13 | −6.5467133E−15 |
| A14 | 3.1650751E−14 | 2.2852184E−15 |

TABLE 4-continued

Example 2 Aspheric Surface Coefficient

| Si | 10 | 11 |
|---|---|---|
| A15 | −2.7260320E−16 | 4.6502930E−16 |
| A16 | −3.2929413E−16 | 4.9987066E−17 |
| A17 | −4.4292120E−17 | 3.8080547E−18 |
| A18 | −3.1315238E−18 | 9.5674668E−20 |
| A19 | 3.8491234E−20 | −2.5154335E−20 |
| A20 | 5.4632924E−20 | −6.2536668E−21 |

EXAMPLE 3

FIG. 3 shows a lens cross-sectional view of the imaging lens of Example 3. The schematic configuration of the imaging lens of Example 3 is as follows. That is, the imaging lens of Example 3 substantially consists of a front group GF having positive refractive power; an aperture stop St; and a rear group GR having positive refractive power in this order from the object side. The front group GF substantially consists of three lenses, i.e., a lens L11 having a positive meniscus shape with a convex surface toward the object side, a lens L12 having a positive meniscus shape with a convex surface toward the object side, and a lens L13 having a negative meniscus shape with a convex surface toward the object side in this order from the object side. The rear group GR substantially consists of five lenses, i.e., a lens L21 having a biconcave shape in a paraxial region, a lens L22 having a biconvex shape, a lens 23 having a biconcave shape, a lens L24 having a biconvex shape, and a lens L25 having a positive meniscus shape with a convex surface toward the image side in this order from the object side. The lens L21 has aspheric surfaces on both sides thereof. The three lenses L22, L23, and L24 are cemented to each other so as to constitute a three-cemented lens; and the other lenses are not cemented to each other, but are single lenses.

Tables 5 and 6 show the basic lens data and aspheric surface coefficients with respect to Example 3, respectively. A through D of FIG. 8 and A through D of FIG. 9 show aberration diagrams of the imaging lens of Example 3, respectively.

TABLE 5

Example 3 Basic Lens Data

| Si | Ri | Di | Ndj | vdj |
|---|---|---|---|---|
| 1 | 30.514 | 2.48 | 1.88300 | 40.8 |
| 2 | 89.581 | 0.10 | | |
| 3 | 16.412 | 3.61 | 2.00330 | 28.3 |
| 4 | 21.555 | 0.49 | | |
| 5 | 25.185 | 1.39 | 1.92286 | 18.9 |
| 6 | 11.715 | 5.17 | | |
| 7 (St) | ∞ | 5.52 | | |
| *8 | −32.604 | 1.52 | 1.56865 | 58.6 |
| *9 | 52.845 | 0.27 | | |
| 10 | 121.830 | 4.16 | 1.88300 | 40.8 |
| 11 | −16.142 | 1.39 | 1.75520 | 27.5 |
| 12 | 52.592 | 3.70 | 1.88300 | 40.8 |
| 13 | −25.953 | 1.44 | | |
| 14 | −20.038 | 1.69 | 1.88300 | 40.8 |
| 15 | −18.238 | 17.00 | | |
| 16 | ∞ | 2.80 | 1.51680 | 64.2 |
| 17 | ∞ | | | |

TABLE 6

Example 3 Aspheric Surface Coefficient

| Si | 8 | 9 |
|---|---|---|
| K | 0.0000000E+00 | 0.0000000E+00 |
| A3 | −2.6121950E−05 | 4.0724098E−05 |
| A4 | −1.8932698E−04 | −1.6037660E−04 |
| A5 | 7.1000277E−06 | 1.4478189E−05 |
| A6 | 5.2226293E−07 | 1.3435699E−07 |
| A7 | 2.4096916E−09 | −1.2019282E−08 |
| A8 | −2.3168507E−09 | −2.2091351E−09 |
| A9 | −3.0198249E−10 | −1.1599457E−10 |
| A10 | −1.9407917E−11 | −4.5907010E−11 |
| A11 | −5.0281789E−13 | 3.9775109E−13 |
| A12 | 4.2067285E−14 | 3.6850235E−14 |
| A13 | 6.9405753E−15 | 1.8502282E−15 |
| A14 | 5.5987309E−16 | 2.5235794E−17 |
| A15 | 2.8158095E−17 | −5.8908492E−18 |
| A16 | 1.9943066E−19 | −7.5676676E−19 |
| A17 | −1.6109209E−19 | 0.0000000E+00 |
| A18 | −2.5627195E−20 | 0.0000000E+00 |
| A19 | −2.8511594E−21 | 0.0000000E+00 |
| A20 | −2.7192293E−22 | 0.0000000E+00 |

Table 7 shows specs, a maximum image height, and values corresponding to conditional expressions (1) through (4) of the imaging lens of each of Examples 1 through 3. f is the focal length of the entire system, BF is a back focus, 2ω is the full angle of view, Fno. is a F-value, and Y is a maximum image height on the image surface. The values shown in FIG. 7 are with respect to the d-line.

TABLE 7

| | Example 1 | Example 2 | Example 3 |
|---|---|---|---|
| f | 36.17 | 36.05 | 36.01 |
| BF | 21.98 | 22.29 | 20.99 |
| 2 ω | 43 | 43.2 | 43.4 |
| Fno. | 1.45 | 1.45 | 1.45 |
| Y | 14.2 | 14.2 | 14.2 |
| Formula (1) Nd2 | 1.88300 | 1.88300 | 1.88300 |
| Formula (2) vd2p − vd2n | 14.3 | 15.1 | 13.3 |
| Formula (3) Nd1 | 1.77950 | 1.81900 | 1.94315 |
| Formula (4) f/Y | 2.547 | 2.539 | 2.536 |

Next, an embodiment of an imaging apparatus according to the present invention will be described with reference to A and B of FIG. 10. A camera 30, a perspective view of which is shown in each of A and B of FIG. 10, and which is detachably equipped with an interchangeable lens 20, is a so called mirrorless single-lens digital camera. A of FIG. 10 shows the outer appearance of this camera 30 viewed from the front, and B of FIG. 10 shows the outer appearance of this camera 30 viewed from the back.

This camera 30 includes a camera body 31 provided with a shutter release button 32 and a power button 33 on the upper surface thereof. Further, operation sections 34 and 35 as well as a display section 36 are on the back surface of the camera body 31. The display section 36 displays photographed images and images before photographing within the angle of view.

A photographing aperture, into which light from a target of photography enters, is provided in the center of the front surface; a mount 37 is provided on a position corresponding to the photographing aperture; and the interchangeable lens 20 is mounted to the camera body 31 through the mount 37. The interchangeable lens houses the imaging lens 1 according to the present embodiments within a lens barrel.

The camera body 31 is provided with an imaging element (not shown), such as a CCD, and the like, which receives an image of a subject formed by the interchangeable lens 20 and outputs image signals corresponding thereto; a signal processing circuit which processes the image signals output from the imaging element and which generates images; a recording medium for recording the generated images; and the like. In this camera 30, a still image corresponding to one flame is photographed by pressing the shutter release button 32 and the image data obtained by this photography is recorded on the above recording medium.

The present invention has been described with reference to the Embodiments and Examples. The present invention is not limited to the embodiments and the examples described above, and various modifications are possible. For example, values, such as the radius of curvature of each lens element, the distances between surfaces, the refractive indices, the Abbe numbers, aspheric surface coefficients, and the like are not limited to the values in the numerical examples shown in the Tables, but may be other values.

Although the embodiment of the imaging apparatus was described an example in which the apparatus is a mirrorless single-lens digital camera with reference to the drawings, the present invention is not limited to this application and can be applied to a single-lens reflex camera, a video camera, a film camera, and the like.

What is claimed is:

1. An imaging lens substantially consisting of a front group having positive refractive power, an aperture stop, and a rear group having positive refractive power in this order from the object side,
    wherein the front group includes two positive meniscus lenses with convex surfaces toward the object side, and one negative meniscus lens with a convex surface toward the object side;
    the rear group includes an aspheric lens and a three-cemented lens in this order from the object side;
    the three-cemented lens is formed by cementing a positive lens with a convex surface toward the image side, a negative lens, and a positive lens with a convex surface toward the image side, in this order from the object side; and
    conditional expression (1) below is satisfied:

$$Nd2 > 1.8 \qquad (1),$$

where
Nd2: an average value of the refractive index with respect to the d-line of positive lenses within the three-cemented lens.

2. The imaging lens of claim 1, wherein the front group includes a positive meniscus lens with a convex surface toward the object side, a positive meniscus lens with a convex surface toward the object side, and a negative meniscus lens with a convex surface toward the object side in this order from the object side.

3. The imaging lens of claim 1, wherein conditional expression (1') below is satisfied:

$$Nd2 > 1.85 \qquad (1').$$

4. The imaging lens of claim 1, wherein conditional expression (2) below is satisfied:

$$vd2p - vd2n > 10 \qquad (2),$$

where
vd2p: the Abbe number of the lens having larger Abbe number with respect to the d-line of two positive lenses among the three-cemented lens, and
vd2n: the Abbe number with respect to the d-line of a negative lens within the three-cemented lens.

5. The imaging lens of claim 4, wherein conditional expression (2') below is satisfied:

$$vd2p - vd2n > 12 \qquad (2').$$

6. The imaging lens of claim 1, wherein conditional expression (3) below is satisfied:

$$Nd1 > 1.7 \qquad (3),$$

where
Nd1: an average value of the refractive index with respect to the d-line of the positive lenses within the front group.

7. The imaging lens of claim 6, wherein conditional expression (3') below is satisfied:

$$Nd1 > 1.75 \qquad (3').$$

8. The imaging lens of claim 1, wherein conditional expression (4) below is satisfied:

$$2 < f/Y < 5 \qquad (4),$$

where
f: the focal length of the entire system, and
Y: a maximum image height on the image surface.

9. The imaging lens of claim 8, wherein conditional expression (4') below is satisfied:

$$2.1 < f/Y < 3.5 \qquad (4').$$

10. The imaging lens of claim 1, wherein the front group substantially consists of a positive meniscus lens with a convex surface toward the object side, a positive meniscus lenses with a convex surface toward the object side, a negative meniscus lenses with a convex surface toward the object side, and a negative meniscus lenses with a convex surface toward the object side, in this order from the object side.

11. An imaging apparatus comprising the imaging lens of claim 1.

* * * * *